T. CLEGG & G. GEE.
HOSE COUPLING.
APPLICATION FILED JAN. 20, 1911.
1,044,495.
Patented Nov. 19, 1912.
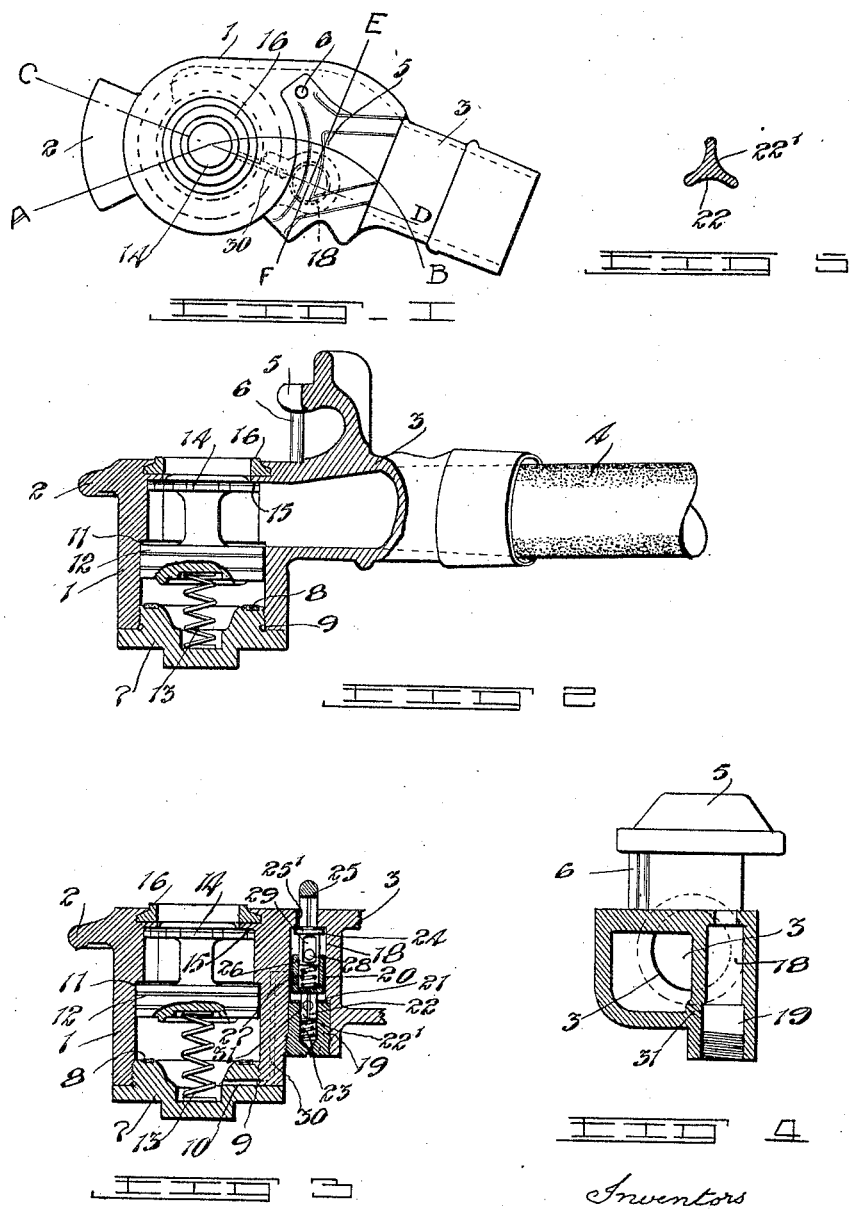

UNITED STATES PATENT OFFICE.

THOMAS CLEGG AND GEORGE GEE, OF CALGARY, ALBERTA, CANADA.

HOSE-COUPLING.

1,044,495.

Specification of Letters Patent.

Patented Nov. 19, 1912.

Application filed January 20, 1911. Serial No. 603,755.

*To all whom it may concern:*

Be it known that we, THOMAS CLEGG and GEORGE GEE, both of the city of Calgary, in the Province of Alberta, Canada, have invented certain new and useful Improvements in Hose-Couplings, of which the following is a specification.

Our invention relates to improvements in hose couplings for use in connection with train or other such pipe lines, and the object of the invention is to provide a device which will eliminate the necessity of using stop or angle cocks on pipe lines carrying fluid pressure for the automatic closing of the coupling when uncoupled, and the automatic opening of the coupling when coupled to another coupler. It is particularly intended for brake pipe line couplings where air brakes are used on trains, for train air signal line couplings and for hose couplings on yard and shop compressed air plants.

With the above objects in view our invention consists in the arrangement and operation of parts hereinafter more particularly described and later pointed out in the appended claim.

Figure 1 is a plan view of one of the couplings. Fig. 2 is a sectional view through the coupler, the section being taken in the plane denoted by the line A B, Fig. 1. Fig. 3 is a vertical sectional view through the coupler, the section being taken in the plane denoted by the line C D, Fig. 1. Fig. 4 is a vertical sectional view through the coupler, the section being taken in the plane denoted by the line E F, Fig. 1, certain parts being removed for the sake of clearness. Fig. 5 is a horizontal cross sectional view through the valve stem 22.

In the drawing like characters of reference indicate corresponding parts in each figure.

1 is the main valve casing supplied with the usual coupler lug 2 and communicating through a pipe 3 with a hose 4.

5 is an overhanging member cast with the casing 1 and formed so as to receive the lug 2 of a complementary coupler similar to that herein described.

6 is a pin which engages with the side of the lug 2 of the complementary coupler when the two are connected. These latter parts are in common use on the present train pipe line couplers and are not further described as their construction and use is well known to one familiar with such devices.

The casing 1 has its lower end threaded internally to receive a plug 7 fitted with a leather facing 8 and supplied with a circumferential groove 9 which communicates through a duct 10 with the inner side of the plug or in other words directly with the interior of the valve casing. The valve casing is supplied substantially mid-way of its length with an annular shoulder 11 against which the piston 12 normally abuts, said piston being supplied with suitable rings to prevent leakage as is customary. A spring 13 is interposed between the under face of the piston and the opposing face of the plug 7.

14 is a main valve carried by the piston and adapted to close normally on a seat 15, which seat is cast with the valve casing.

16 is a gasket located directly above the valve. The coupler is cored out to form a cavity or cylindrical valve chamber at 18, the lower end of the chamber being closed by a screw plug 19. Within the cylindrical chamber is a valve 20 in the form of a socket, which valve is adapted to seat at 21 on the upper end of the plug 19. The valve 20 carries a stem 22 which extends into the center of the plug 19 which is bored out to receive it. A spring 23 is located at the lower end of the stem and bears against the plug. The valve stem has portions thereof 22′ cut away for a purpose shortly explained. 24 is a further valve located within the cylindrical chamber 18 and carried by a valve stem 25 which extends through a passage way 25′ beyond the upper face of the coupler and appears immediately beneath the portion 5 already referred to. The stem 25 has also portions thereof cut away in the same manner as the stem 22. A plunger 26 extends downwardly from the valve 24 into the socket, and a spring 27 is interposed between the end of the socket and the plunger.

28 is a pin passing across the socket and through a suitable slot 29 formed in the plunger.

30 is a duct leading from the cylindrical chamber 18 to the duct 10, the connection between these ducts being made possible by the annular groove 9 formed in the plug 7.

31 is a duct passing from the pipe 3 to the cylindrical opening or chamber 18, such duct opening to the chamber a point beneath the valve seat 21.

When two couplings are to be coupled together the operation is as follows:—The stems 25 of the valves 24 are depressed by the lugs 2 of the respective couplings so that whatever pressure is at the back of the piston 12 is released through the ports 10 and 30 to atmosphere as the valves 24 are away from their seats and the valves 20 are on the seats 21. The pressure in the pipe line 4 consequently forces the piston 12 in a direction which unseats the valve 14 so that the fluid pressure is allowed to pass to the adjoining coupling. When couplers such as these are uncoupled the act of turning the couplers to release them one from the other, frees the stems 25 so that the valves 24 are seated and the valves 20 unseated, thereby allowing the pressure in the pipe lines to pass to the back of the pistons 12 through the ports 31, 30 and 10 to the back of the pistons, thereby seating the valve 14, this release taking place before the couplings are actually parted. Consequently there is no escape of pressure from the pipe lines. If however the couplers are broken apart through an accident such as a train wreck, the air brakes will be set by the drop of pressure in the pipe lines as the couplers will be torn apart before the valves 14 can seat.

What we claim as our invention is:

In a hose coupler, the combination of a valve casing having an open top and closed bottom, a pipe opening to the casing and communicating with the hose, a valve within the casing adapted to close the open end thereof, a piston carried by the valve and slidable within the casing, a spring engageable with the under face of the piston and the base of the casing, a valve chamber adjoining the casing and presenting an upper and a lower valve seat, there being a duct leading from beneath the lower valve seat to the interior of the pipe, and a duct leading from above the lower valve seat to the interior of the valve casing beneath the piston, and further a passage way leading from the top of the valve chamber to the exterior of the coupling, a spring-pressed valve in the form of a socket slidable within the valve chamber and adapted to seat on the lower valve seat, a valve stem passing through the passage way and projecting beyond the face of the coupling, a valve carried by the stem and designed to seat on the upper valve seat, a plunger extending downwardly from the latter valve and into the socket, a spring interposed between the end of the plunger and the base of the socket, and a pin carried by the socket and passing through a suitable slot formed in the plunger, as and for the purpose specified.

Signed at Winnipeg, in the province of Manitoba, this 28th day of November, 1910.

THOS. CLEGG.
GEORGE GEE.

In the presence of—
G. L. ROXBURGH,
J. K. ELKIN.